A. L. BAUSMAN.
CONVEYER BELT FOR CONFECTIONERY MACHINES.
APPLICATION FILED JAN. 7, 1911.
1,141,861.
Patented June 1, 1915.
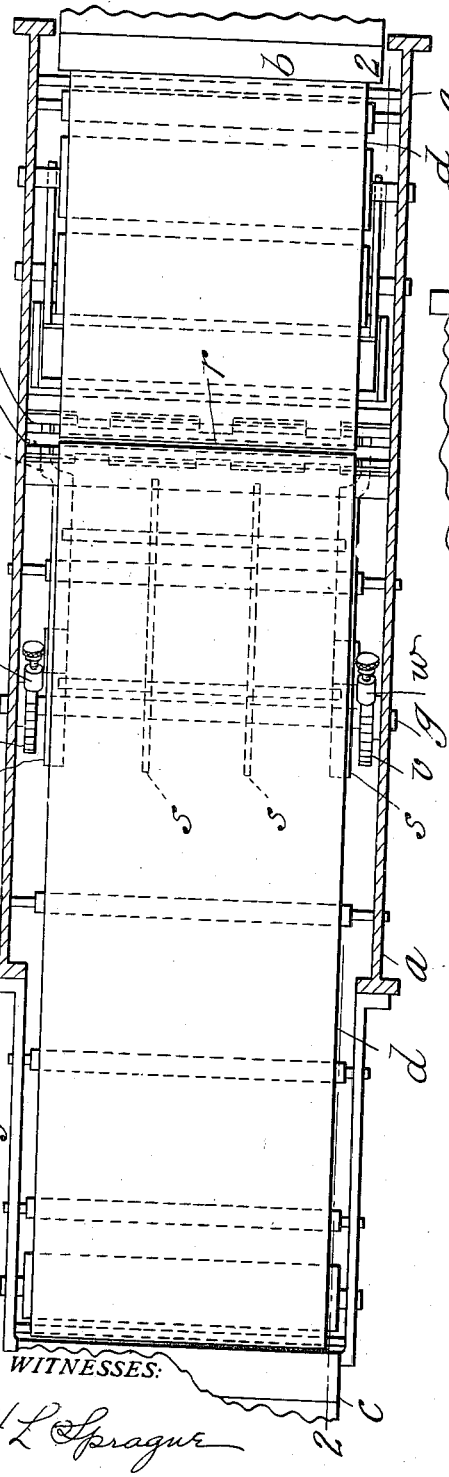
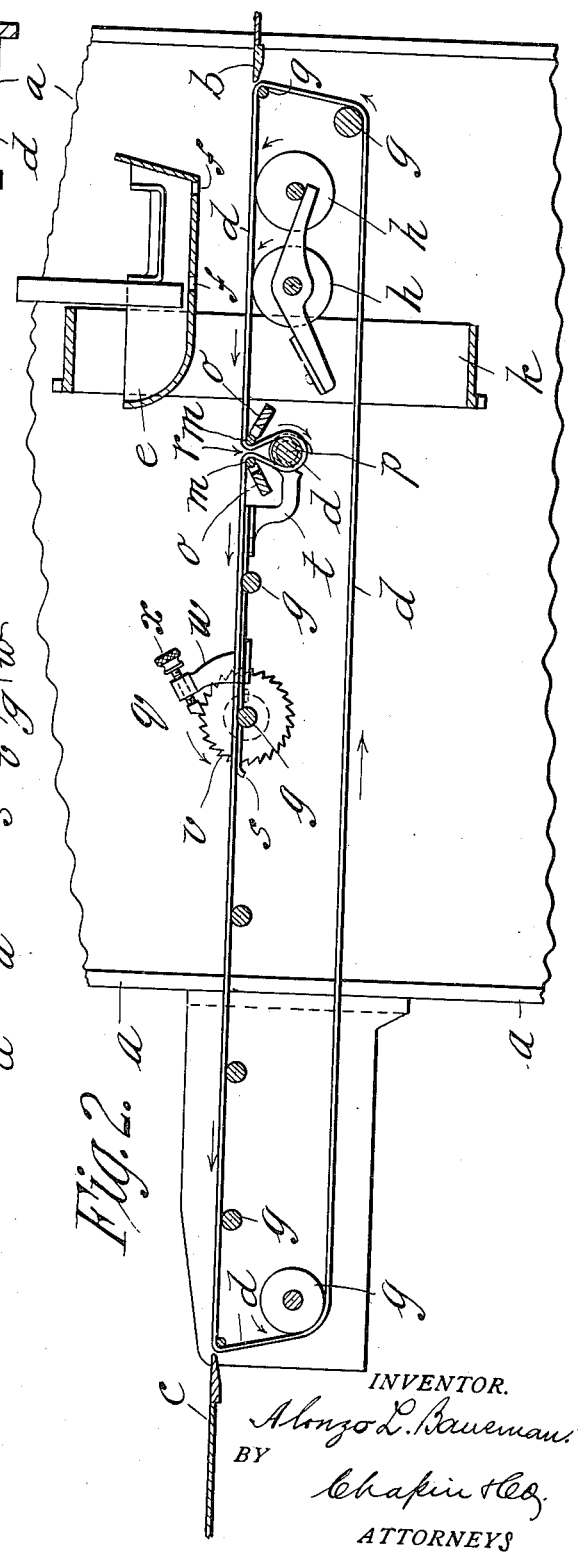
WITNESSES:
H. L. Sprague
Harry W. Bowen.
INVENTOR.
Alonzo L. Bausman.
BY
Chapin & Co.
ATTORNEYS

UNITED STATES PATENT OFFICE.

ALONZO LINTON BAUSMAN, OF CHICOPEE, MASSACHUSETTS, ASSIGNOR TO NATIONAL EQUIPMENT COMPANY, OF SPRINGFIELD, MASSACHUSETTS, A CORPORATION OF MASSACHUSETTS.

CONVEYER-BELT FOR CONFECTIONERY-MACHINES.

1,141,861. Specification of Letters Patent. Patented June 1, 1915.

Application filed January 7, 1911. Serial No. 601,438.

*To all whom it may concern:*

Be it known that I, ALONZO LINTON BAUSMAN, a citizen of the United States of America, residing at Chicopee, in the county of Hampden and State of Massachusetts, have invented new and useful Improvements in Conveyer-Belts for Confectionery-Machines, of which the following is a specification.

This invention relates to confectionery machinery and specifically to machinery for coating confections with chocolate or other coating material. In machines of this class the confections are usually placed on a conveyer and moved thereby beneath a receptacle containing the liquid coating material which is permitted to flow over the confections, to which said material adheres, the viscosity of said coating material being maintained at that point which produces the best results, by regulating the temperature thereof.

The conveyer generally consists of a perforated endless apron running over suitable rolls, one or more of which is located approximately beneath the openings in the receptacle for the coating, and these rolls become covered with the coating material and serve to apply the material to the underside of the confections to the required quantity, which may be varied by varying the diameter of these rolls.

To properly distribute the coating material over confections of certain shape or volume, it has been generally customary to apply a shaking movement to the conveyer by rapping or tapping it to set up a suitable vibratory movement for the purpose indicated, said vibration being applied for certain purposes to the area of the conveyer contiguous to the point at which the flooding of the confections takes place. For other confections it is desirable to apply the rapping or vibratory movement to the conveyer at a point beyond that at which the flooding takes place and to eliminate all vibration from the area of the conveyer directly beneath the coating receptacle, the object in vibrating the belt at a point beyond this area being to prevent the adhesion of the confections to the conveyer as the coating material begins to cool and harden.

The object of the present invention is to provide a conveyer which will permit the application of the rapping or shaking movement to a certain area thereof without permitting transmission of this movement to a contiguous area of the conveyer, and the invention consists in the construction shown and described in the following specification and summarized in the claims appended thereto, said invention being illustrated in the accompanying drawings, in which,—

Figure 1 is a plan view of a portion of a machine for coating confections in which the invention is embodied, part of the frame of the machine being in section. Fig. 2 is a sectional elevation of that part of the machine to which the invention has been applied, this view showing means for elevating liquid chocolate from a receptacle in one part of the machine to another receptacle from which said material may be made to flow over the confections moving beneath it, to coat the same.

Referring now to the drawings, $a$ indicates the frame of the machine, and $b$ the table at the feed-end thereof; $c$ the table at the delivery end, and extending between these two points is a conveyer $d$ which preferably is made up of a series of wires extending transversely thereof in separated relation one to the other and so disposed and articulated as to constitute an endless flexible belt or apron on which confections may be placed at the feed end thereof,—and by the movement of the belt in the direction of the arrows shown on Fig. 2 carried to the table $c$ at the delivery end of the machine. This conveyer is only shown in a conventional manner in the drawings and while its preferred construction is as described, it may be made otherwise, if desired.

Located near the feed end of the machine is a receptacle $e$ for chocolate and other coating material, which receptacle is provided with openings $f$ in the bottom thereof through which said material may flow, whereby as the confections are carried along by the conveyer, they will pass through the descending stream of material and become entirely coated with said material.

The conveyer is supported, as shown, on suitably disposed rolls $g$, and directly under the openings $f$ in the receptacle $e$ there is placed a pair of larger rolls $h$ which bear upon the underside of the conveyer $d$ and have approximately the same peripheral speed as the linear speed of the conveyer. These rolls $h$ become covered with the coating material, the surplus of which material runs off and down into a receptacle beneath the receptacle $e$, not shown, in which it is re-heated and carried up again to the receptacle $e$ by means of an elevating mechanism indicated by $k$. This elevating mechanism is well known and need not be described.

By reason of the adhesion of the coating material to the surface of the rolls $h$, said material is applied to the under side of the confections, and as the latter move onward the coating material is cooled by means of an air-blast (the devices for applying which are not shown) and at a certain point during the movement of the confections through the machine it becomes desirable to prevent the adhesion of the confections to the conveyer; means are therefore provided for shaking or rapping the conveyer to prevent such adhesion. At the same time, it is desirable, in certain classes of confections, that the vibrations transmitted to the conveyer by the rapping devices should be limited or confined to a certain area contiguous to the rapping or shaking device, to the end that the confections located on another and perhaps contiguous area of the conveyer, shall not be disturbed.

To permit the shaking or vibration of the conveyer for the purpose described, and to absolutely provide against the possibility of this jarring movement being transmitted to that area of the belt on which may be located confections, the coating of which is in a softer condition, two small rolls $m$ are provided between which there is space enough to receive two thicknesses of the conveyer without touching, these rolls being so positioned as to serve as supporting rolls for the upper side of the conveyer. As shown in Fig. 1, these are mounted in the frame of the machine, and to prevent them from springing under the tension of the conveyer, each roll is backed up by a brace-bar $o$ which bears thereagainst, at intervals, across the entire width of the machine. Just below these two rolls is mounted another and somewhat larger roll $p$ around which the conveyer is passed. By thus mounting the conveyer, if the rapping device (indicated as a whole by $q$ in Fig. 2) be located between the delivery table $c$ and the rolls $m$ all of that area of the conveyer located between said rolls $m$ and the table $b$ at the feed end of the machine will be absolutely free from any vibration, however violently said vibration may be imparted to the conveyer beyond the rolls $m$ and between the latter and the table $c$ by the operation of the shaking or rapping device $q$.

The diameter of the rolls $m$ may be made so small and the thickness of the conveyer apron is so slight that notwithstanding the fact that there is a distinct break in the continuity of the upper surface of the conveyer and extending entirely across the latter, as shown at $r$ Fig. 1, the width of said space is so narrow, relatively, that confections, even of the smallest size, will be carried across said space $r$ without any trouble whatsoever. This break in the continuity of the conveyer surface serves also to positively detach each confection from the conveyer, and as at this point the coating material has not become entirely hard, to prevent further adhesion thereof to the conveyer, and the shaking or rapping device $q$ is so located that approximately, as soon as the confections have passed over the space $r$ in the conveyer, they will enter upon that part thereof subject to agitation through the operation of the rapping device. This rapping device may be of any well known construction,—that shown in the drawing consists of a frame comprising the flat bars $s$, one of which is located under each edge of the conveyer, as shown in Fig. 1, besides two narrower intermediate bars $s$, all four of these bars being carried on a frame $t$, pivotally supported on the ends of the roll $p$. These bars extend over one or more of the rolls $g$ in annular grooves cut therein, whereby the upper surface of these bars may be flush with, or slightly below, the peripheries of the rolls $g$ over which they extend, whereby the weight of the conveyer is supported by the rolls and not by the bars of the shaking frame, and whereby friction between the conveyer and the said bars is eliminated. On one of these rolls $g$, at each end thereof, is secured a ratchet-wheel $v$, and secured to each of the bars $s$ under the opposite sides of the conveyer is an upstanding arm $w$ having an adjustable screw-threaded rod $x$ passing therethrough, the end of which, suitably formed, bears on the teeth of the ratchet-wheel $y$. Therefore as the rolls $g$ carrying the ratchet-wheels rotates the arms $w$, the bars $s$ will be raised and dropped as each tooth of the ratchet-wheel passes under the point of the rod $x$.

As the shaking frame is lifted up pivoting on the shaft $p$, the opposite end of the frame lifts against the tension of the conveyer, which is sufficiently tight to serve as a sort of spring to snap the frame downward again as the point of the tooth in the ratchet-wheel $v$ is passed, and the rotation of the ratchet-wheel is sufficiently rapid to produce a very rapid jarring or rapping movement to that area of the conveyer near the rapping device; but, as stated, because of the passage of the conveyer over the rigidly supported rolls $m$, $m$, and $p$ none of the vibration imparted by the rapping device can extend past the transverse break in the surface of the conveyer, indicated by the letter $r$.

Of course, the rapping device, if desired, may be located between the two rolls *m* and the feeding table *b* which for some classes of confections might be desirable, and in that case, obviously all of that part of the conveyer located between said rolls and the delivery table *c* would be free from vibration. It is thus seen that the essential feature of the invention resides in means to render a certain area of the conveyer in machines of this class absolutely free from any vibration applied to another, though contiguous, part of the conveyer.

What I claim, is:—

1. In candy machinery, an endless flexible conveyer, a deflecting device therein arranged to form a break in the top surface thereof, whereby two conveyer sections are formed, a coating device disposed above one section and a shaking device on the other section to impart vibrating motions thereto, whereby said deflecting device prevents the transmission of said vibratory motion from one section to the other.

2. In a candy coating machine, an endless conveyer for the candy, a deflecting device adapted to deflect the conveyer intermediate the end extremities thereof, a shaking device located between said deflecting device and one end extremity of the conveyer and adapted to vibrate said conveyer, said deflecting device arranged to prevent the transmission of vibrations therethrough.

ALONZO LINTON BAUSMAN.

Witnesses:
 Wm. H. Chapin,
 Harry W. Bowen.

Copies of this patent may be obtained for five cents each, by addressing the "Commissioner of Patents, Washington, D. C."